No. 842,934. PATENTED FEB. 5, 1907.
J. BOLTON & J. WEISS.
SEWING MACHINE.
APPLICATION FILED JULY 10, 1905.

Witnesses:
J. B. Weir
Jas. D. Perry

Inventors
James Bolton and
John Weiss
By Jno. G. Elliott Atty

UNITED STATES PATENT OFFICE.

JAMES BOLTON AND JOHN WEISS, OF CHICAGO, ILLINOIS.

SEWING-MACHINE.

No. 842,934.　　　　Specification of Letters Patent.　　　　Patented Feb. 5, 1907.

Application filed July 10, 1905. Serial No. 268,986.

*To all whom it may concern:*

Be it known that we, JAMES BOLTON and JOHN WEISS, both citizens of the United States, residing in the city of Chicago, county of Cook, and State of Illinois, have invented certain new and useful Improvements in Sewing-Machines, of which the following is a full, clear, and exact specification.

This invention relates to improvements in sewing-machines in which one or more shafts and gearings have heretofore been employed for connecting the horizontal drive-shaft in the arm with the hook or shuttle-carrier of the machine.

This invention further relates to improvements in sewing-machines in which the joint between the fly-wheel and the bearing of the drive-shaft in the arm is of such a character that the lubricant from the bearing is discharged to the outer surface of the arm and the hub of the fly-wheel and drips down upon and injures the fabrics during the operation of the machine thereon.

The prime object of our invention is to entirely dispense with all gear and shaft connection between the drive-shaft of a sewing-machine and the hook and shuttle carrier as may be and to substitute therefor a belt-and-pulley connection, and thereby secure all of the advantages of high speed, uniformity in motion of a shuttle-carrier and hook, reduction of noise, power required, and expense of production accruing to the use of belts and pulleys as power-transmitting devices.

A further object of our invention is to provide a simple and effective means whereby oil discharging from the bearing of the main shaft of a sewing-machine will be prevented from escaping externally thereto and be discharged into the drip-pan commonly used internally at the base of the upright supporting the overhanging arm in a sewing-machine.

With these ends in view our invention consists in certain features and novelty in construction, combination, and arrangement of parts by which said objects and certain other objects hereinafter appearing are attained, all as fully described in reference to the accompanying drawings and more particularly pointed out in the claims.

Figure 1:
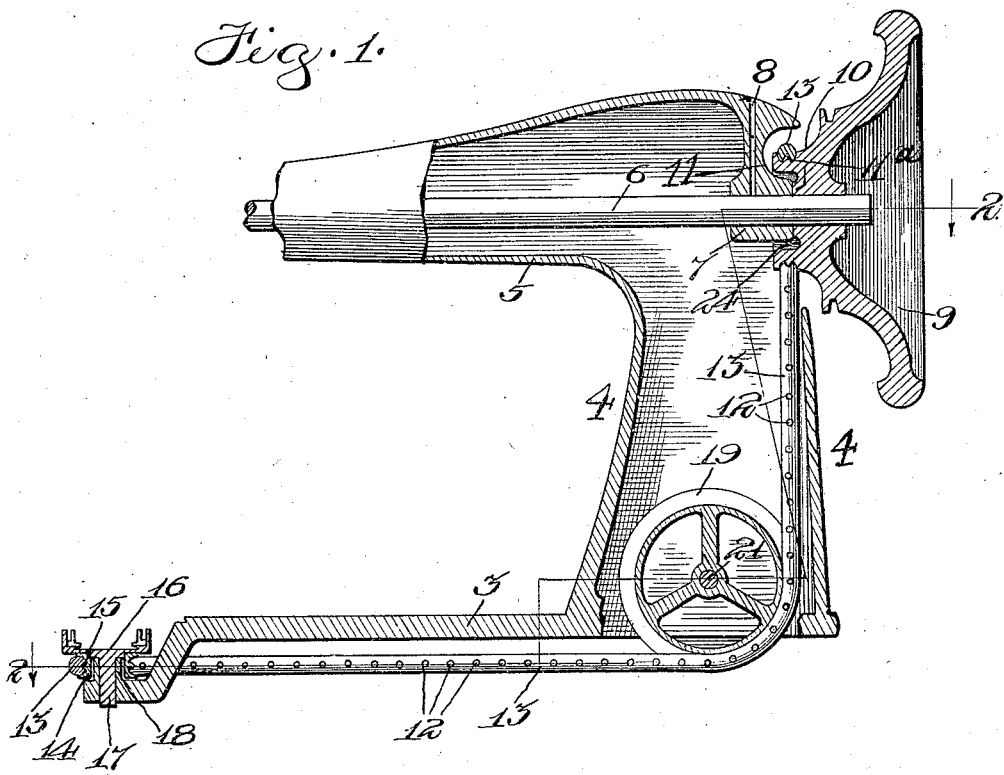
Figure 2:
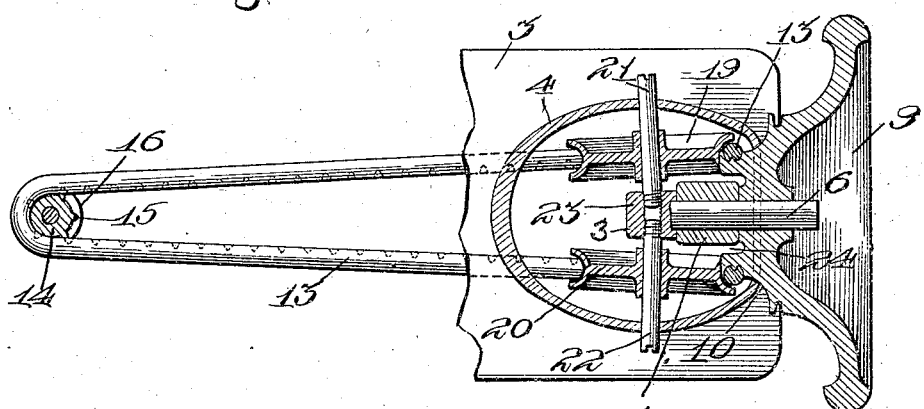

In said drawings, Figure 1 indicates a vertical section at one side of the drive-shaft through the arm, bed-plate, and a sewing-machine hook or shuttle carrier as may be; and Fig. 2 is a section on the line 2 2 of Fig. 4.

Similar numerals of reference indicate the same parts in the figures of the drawings.

3 indicates the bed-plate of a sewing-machine, upon which is mounted the vertical member or support 4 of the overhanging arm 5, in which is journaled in the usual manner the drive-shaft 6, which projects through and has its bearing in a hanger 7, forming a part of the rear side wall of the overhanging arm, which bearing is supplied with oil, as usual, through the duct 8. Keyed or otherwise secured to the outer projecting end of the shaft 6 is a balance-wheel 9, projecting beyond the inner end of the hub 10, on which is annular flange 11, forming a pulley in the groove of which are a series of projecting teeth or lugs 11ª at regular intervals of each other and which are adapted to be engaged by corresponding indentations or perforations 12 in an endless belt 13, which, as shown, is circumferential in cross-section, but may be angular or of other form. Belt 13 at its opposite extremity from the balance-wheel encircles a pulley 14, provided with teeth 15 similar to those on the balance-wheel, to which pulley is secured a hook 16, and which may be a shuttle-carrier, the vertical shaft 17 of which has its bearing in the arm 3, and a boss 18 projecting upwardly therefrom. Internally of the base of the upright 4 and projecting slightly below the bed-plate 3 are two plain pulleys 19 and 20, having loose bearings respectively on the shafts 21 and 22, passed through the side walls of the uprights 4 and at the inner ends screwed into a block 23, which may be a standard or a projection from the walls of the upright 4, which pulleys converge to correspond with the convergence of the belt 13, due to the difference in the diameter of the hub of the balance-wheel and that of the pulley 14 of the shuttle hook or carrier. Pulleys 19 and 20 have their axes at substantially a right angle to that of the balance-wheel, with the result that the imperforate side or edge of the belt engages therewith, as indicated in the drawings, and whereby in view of the fact that the pulleys are idlers the friction of the pulleys on their bearings and belt on the pulleys is reduced to a minimum. The belt 13 is not only continuous in a general sense, but is unbroken by joints of any kind, and as a result of which some convenient means must be provided for placing it in its operative position, and to this end the rear wall of the upright 4 next below the hub of the balance-wheel is provided with a slot of any form or size, which after the belt has passed over the fly-wheel to its hub will enable the remaining portion of the belt to be passed through the upright and conducted downwardly around the pulleys 19, 20, and 14 to its operative position thereon, and which is not only a convenient means for this purpose, but also for removing the belt when worn out and substituting another therefor.

The hub 10 of the balance-wheel, as before stated, has an endwise bearing against the bearing of the shaft 6, but unlike other hubs it is provided with an annular groove, which together with the flange 11 form a chamber 24, the walls of which project inwardly beyond the end bearing of the hub and hanger to such a distance as will insure oil discharging between these end bearings to be conducted, by means of the annular flange 11, inwardly to a point immediately above the drip-pan (not shown) commonly located at the bottom of the upright 4, with the result that no lubricating-oil escaping from the bearing of the main shaft can possibly discharge outside of the upright upon the goods upon which the machine is operating, nor is it possible for the lubricant to be conducted upon the outer surface of the balance-wheel and thence discharge upon such goods and for the reason that it must drip directly into the pan.

Our invention is not limited to the employment of the specific belt, pulleys, and idlers shown, but includes belts of any material or form in cross-section, either perforated or plain, which may be found adapted for the purposes and which has the desired flexibility for ease of movement and no liability of sliding upon the pulleys, nor is our invention limited to to the converging arrangement of the pulleys or idlers 19 and 20 nor to the means by which their shafts are secured in position, for obviously both pulleys might be upon a single shaft and in parallel arrangement without departure from the spirit of our invention. So, also, the pulleys may have teeth and the belt be correspondingly perforated, if desired or required, without a substantial departure from our invention.

Having described our invention, what we claim, and desire to secure by Letters Patent, is—

1. In a sewing-machine, the combination with the power-shaft, a pulley thereon, a pair of plain pulleys below the same, a shuttle-carrier or hook and a pulley directly attached thereto, of an endless belt mounted upon said pulleys, whereby a shuttle-carrier or hook is directly and wholly actuated from the power-shaft by a belt, substantially as described.

2. In a sewing-machine, the combination with a power-shaft, shuttle-carrier or hook and an endless belt directly connecting said belt and carrier, of pulleys supporting and directing said belt at a point intermediate to power-shaft and hook or carrier, substantially as described.

3. In a sewing-machine, the combination with a power-shaft, a hook or shuttle-carrier and an endless belt directly connecting said hook and carrier, of converging pulleys supporting and directing said belt at a point intermediate to power-shaft and hook or carrier, substantially as described.

JAMES BOLTON.
JOHN WEISS.

Witnesses:
   JNO. G. ELLIOTT,
   JOHN H. McELROY.